United States Patent [19]

Stann

[11] Patent Number: 4,968,085
[45] Date of Patent: Nov. 6, 1990

[54] TRUCK BED COVER

[76] Inventor: Marc Stann, Rt. 2, Box 179PH, Hendersonville, N.C. 28739

[21] Appl. No.: 358,058

[22] Filed: May 30, 1989

[51] Int. Cl.⁵ .............................................. B60P 7/02
[52] U.S. Cl. ...................................... 296/100; 296/98
[58] Field of Search .................. 296/98, 100; 150/166; 160/84.1, 327, 368.1

[56] References Cited

U.S. PATENT DOCUMENTS

| | | | |
|---|---|---|---|
| 2,874,709 | 2/1959 | Cohen et al. | 150/166 |
| 4,036,521 | 7/1977 | Clenet | 296/100 |
| 4,285,539 | 8/1981 | Cole | 296/100 X |
| 4,479,677 | 10/1984 | Gulette et al. | 296/100 X |
| 4,526,416 | 7/1985 | Rode | 296/100 |
| 4,607,876 | 8/1986 | Reed | 296/100 |

Primary Examiner—Margaret A. Focarino
Assistant Examiner—Joseph D. Pape
Attorney, Agent, or Firm—Wolder, Gross & Bondell

[57] ABSTRACT

A truck bed cover is provided for the covering and protection of loads of varying height. The cover includes a generally rectangular center section of a size adapted to cover the truck bed, surrounded by four outwardly-extending panels or flaps. Each of the flaps is provided with a series of connectors designed to mate with compatible elements located on the truck bed sides. The connectors are arranged on the panels such that the panels may be folded to provide various effective heights for the cover, the folded portions of the panels being maintained in position by complementary fasteners located on the cover. In a preferred embodiment, the connectors are in the form of grommets which mate with studs located on the truck body.

5 Claims, 4 Drawing Sheets

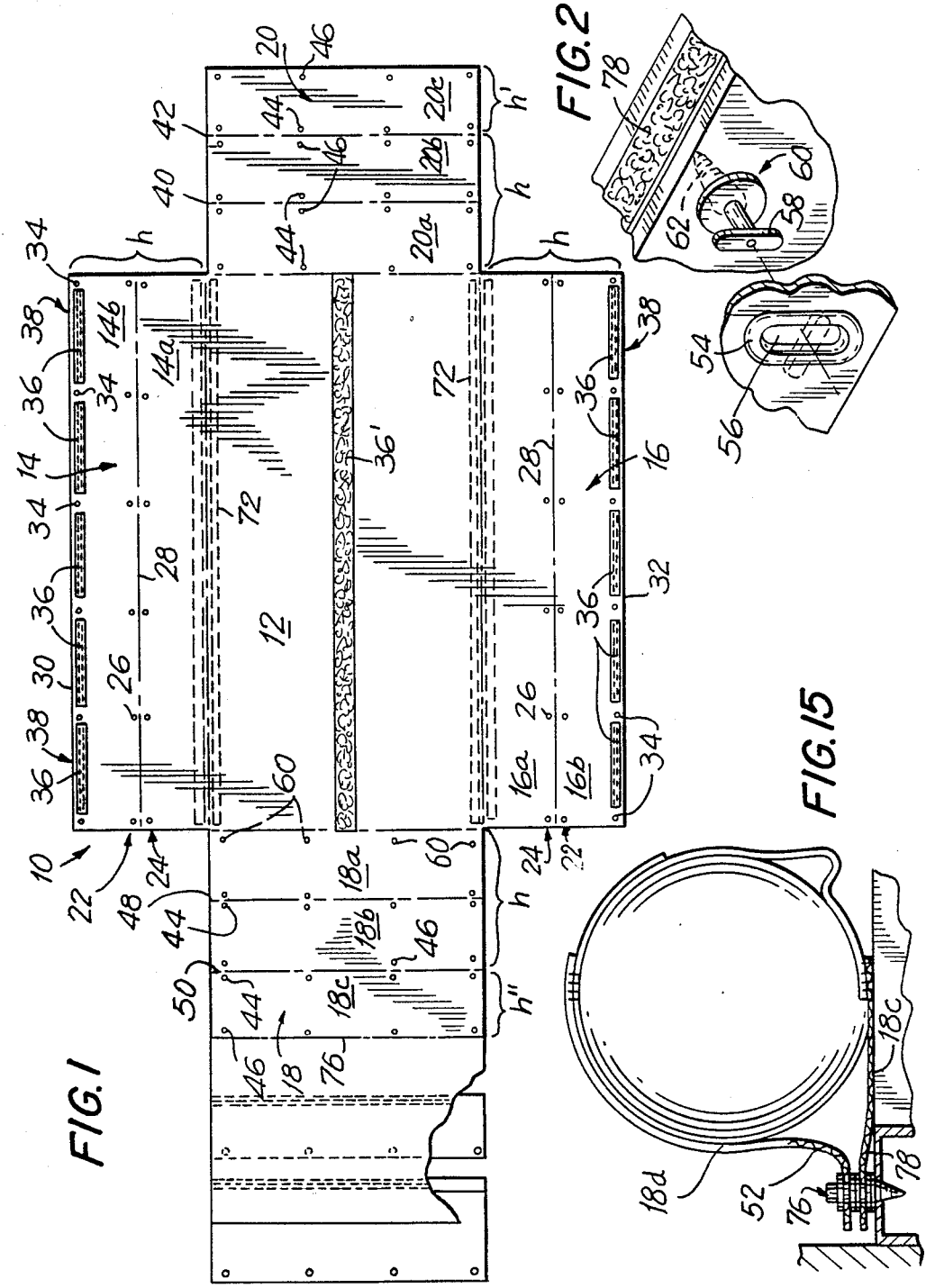

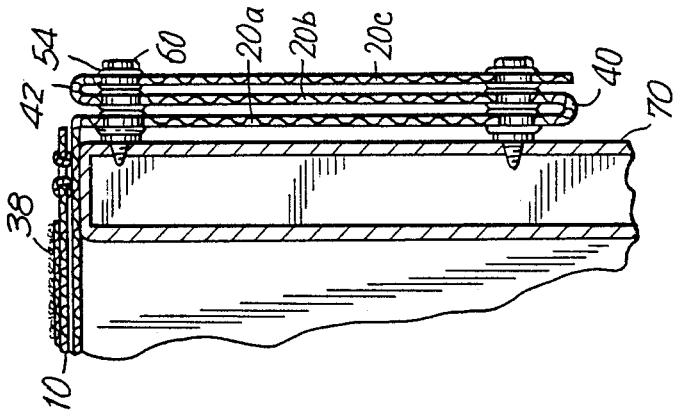
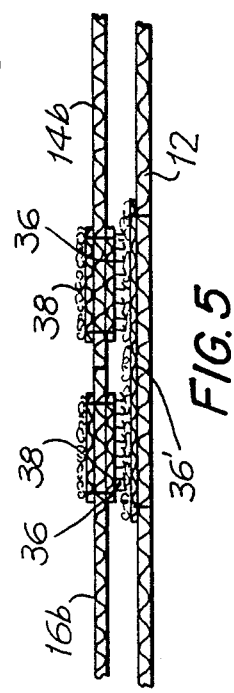
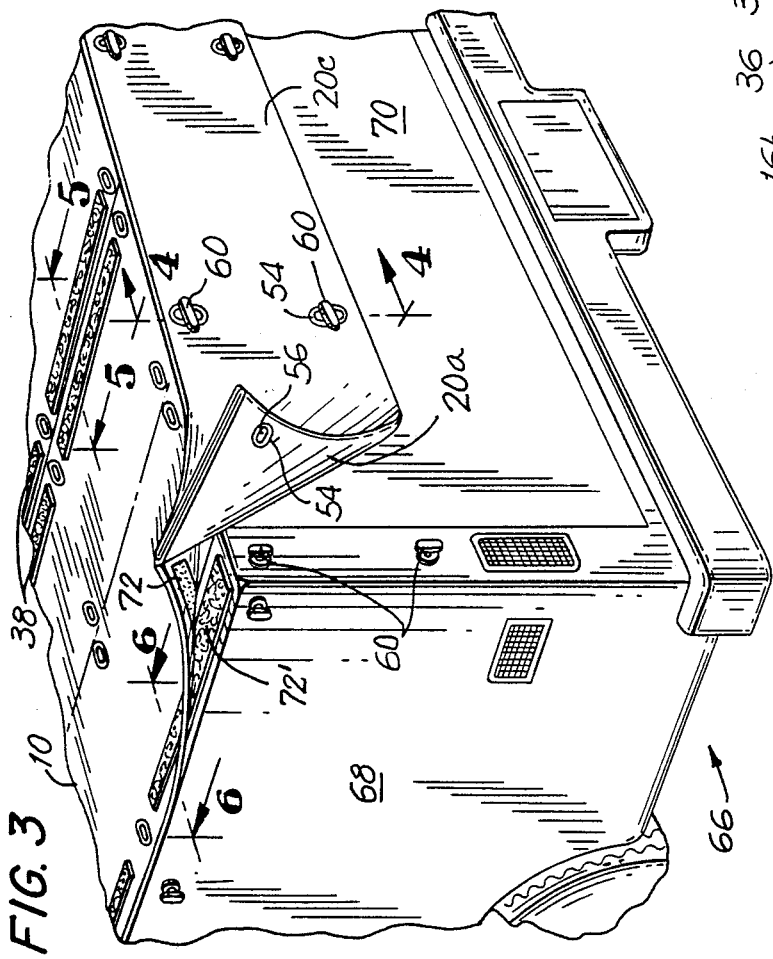
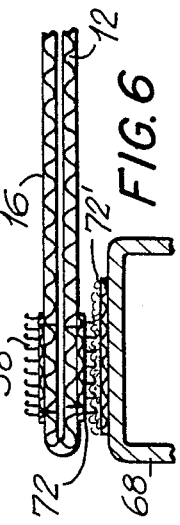

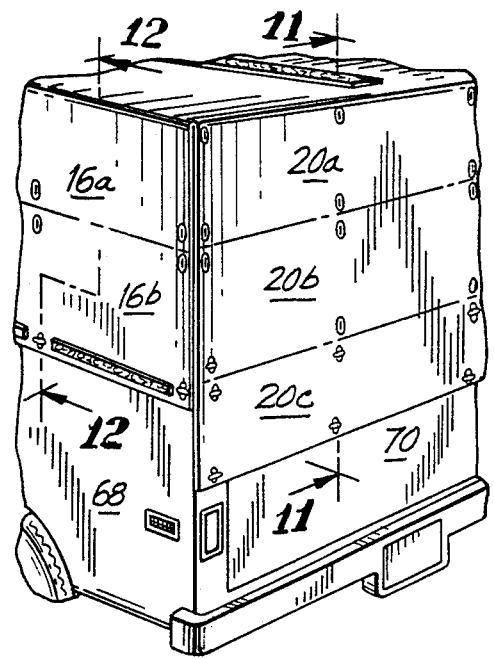
FIG.10
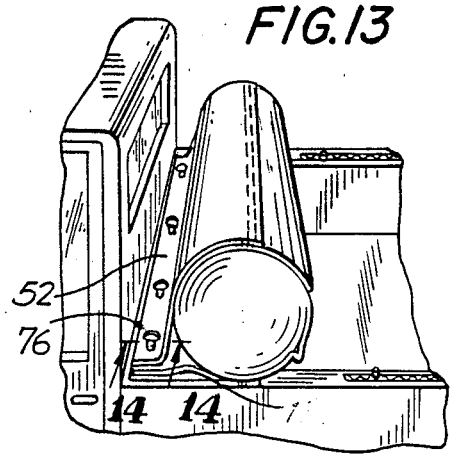
FIG.13
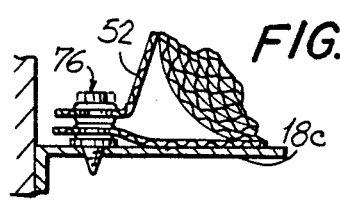
FIG.14
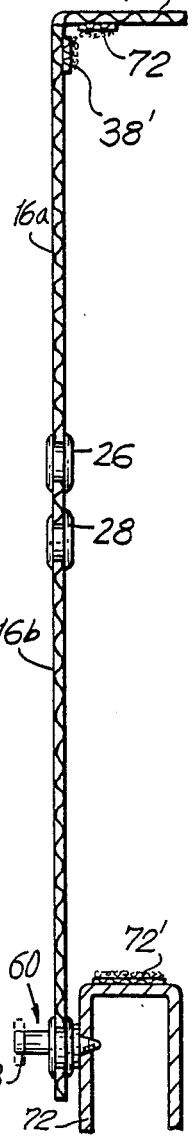
FIG.11
FIG.12
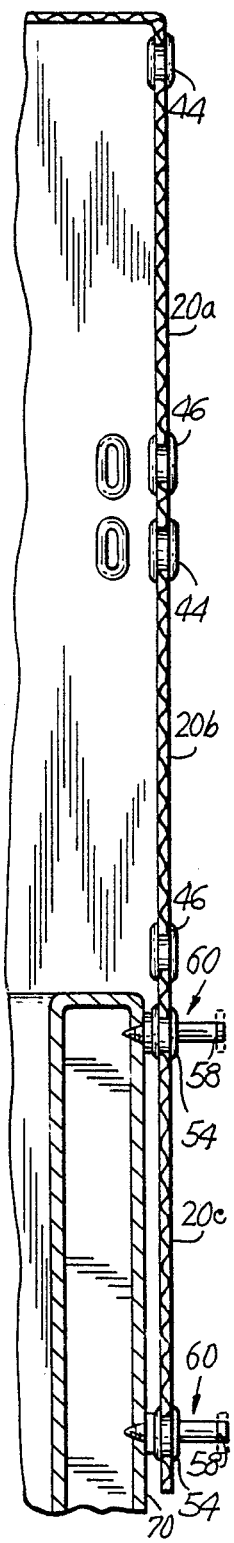

TRUCK BED COVER

The present invention relates to a new and improved vehicle accessory and, in particular, to a flexible cover which may be utilized on pickup trucks, dump trucks, open-bed utility trailers and the like to cover and protect the truck bed and items placed thereon.

BACKGROUND OF THE INVENTION

For both aesthetic and safety reasons, the contents placed on the bed of a truck, whether it be a dump truck, pickup truck or other similar types of vehicles having an open and exposed bed, should be covered. In fact, there are numerous ordinances and laws in jurisdictions throughout the United States which require the covering of loads. Oftentimes, this is done by the lashing of a tarpaulin over the load, affixing the tarpaulin to the bed sides. At best, this is an awkward and time consuming operation, and often results in a less than satisfactory covering.

The problem of providing a proper cover for such beds has also been addressed by patented inventions. For example, U.S. Pat. Nos. 3,146,824 of Sept. 1, 1964 to Veilleux; 3,977,719 of Aug. 31, 1976 to Thurston; 4,563,034 of Jan. 7, 1986 to Lamb; 2,591,186 of Apr. 1, 1952 to Neitzke; and 2,230,908 of Feb. 4, 1941 to Reiman each disclose roller and tarpaulin assemblies intended to be utilized as a truck bed cover. For various reasons, however, the prior art as illustrated by such inventions have been subject to shortcomings.

For example, prior art covers often do not allow access to a bed-mounted tool box. Typical covers must extend along the entirety of the bed, thus covering a tool box which is normally permanently affixed to the front end of the bed. With the tool box covered, access thereto is hindered, as the cover must be removed.

It is accordingly a purpose of the present invention to provide a truck bed cover system which may be easily and economically installed upon a truck body.

Yet another purpose of the present invention is to provide such a cover assembly which may be adapted to use with a variety of loads having varying heights above the truck bed.

A further purpose of the present invention is to provide a truck bed cover which may be easily adapted for use on trucks of varying bed sizes, with and without tool boxes and other accessories which may or may not need to be covered.

Yet a further purpose of the present invention is to provide a truck bed cover that may be easily stored and removed when necessary and yet provides sufficient protection for the enclosed load.

BRIEF DESCRIPTION OF THE INVENTION

In accordance with the above and other purposes and objects, the present invention comprises a shaped cover formed of a sheet-like material, such as canvas, heavy duty nylon or the like, having a central, load-covering section bounded by a plurality of panels extending from the sides and ends of the central section. The side panels are divided into sub-panels which permit the effective height of the side panels to be adjusted as required by folding of the sub-panels to conform to the height of the load to be covered. Attachment means are provided on the panels, as well as on the truck bed sides to permit the cover to be firmly affixed to the truck. Further means are provided on the cover to retain the side panels in a folded configuration as required. In a particularly preferred embodiment, means are provided to allow the cover to be rolled into a relatively unobtrusive package, which may be stored at the forward end of the truck bed, within a pouch that is part of the cover and which allows the cover to be easily opened and installed.

BRIEF DESCRIPTION OF THE DRAWINGS

A fuller understanding of the present invention will be accomplished upon consideration of the following detailed description of a preferred, but nonetheless illustrative embodiment of the invention when taken in conjunction with the annexed drawings, wherein:

FIG. 1 is a top plan view of a typical cover formed in accordance with the present invention;

FIG. 2 is a perspective detail view of a representative connection of the cover to the truck body;

FIG. 3 is a perspective view of a typical rear corner of a truck depicting the cover of the present invention being installed thereon in the lowest position.

FIG. 4 is an elevational section view taken along line 4—4 of FIG. 3 detailing the stowing of unused portions of the rear flap panel of the cover;

FIG. 5 is an elevational section view taken along line 5—5 of FIG. 3, detailing stowage of the side flaps;

FIG. 6 is an elevational section view taken along line 6—6 showing means by which edges of the cover are affixed to the truck sides;

FIG. 10 is a perspective view of a typical rear corner of a truck having a fully loaded bed requiring full height extension of the cover of the present invention;

FIG. 11 is an elevational section view taken along line 11—11 of FIG. 10 depicting the rear flap panel of the present invention in the fully opened and extended configuration;

FIG. 12 is an elevational section view taken along line 12—12 of FIG. 10 depicting a side flap of the cover of the present invention in the fully-opened and extended configuration;

FIG. 13 is a perspective view of the storage mechanism for the present invention;

FIG. 14 is a sectional view taken along line 14—14 of FIG. 13 detailing the mounting for the storage unit; and FIG. 15 is a sectional view taken along line 15—15 of FIG. 13.

DESCRIPTION OF A PREFERRED EMBODIMENT

Figure 8:
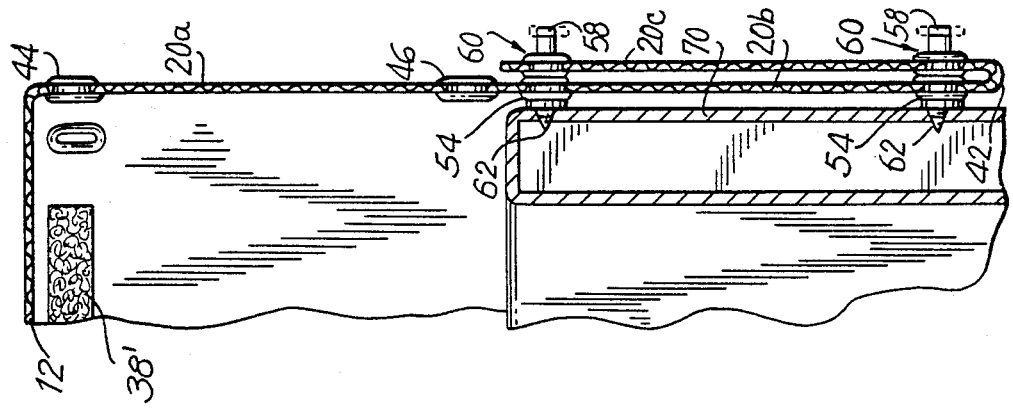
FIG. 8 is an elevational section view taken along line 8—8 of FIG. 7 depicting the configuration of the rear flap panel of the cover in conjunction with such a high elevation load.

Referring to the Figures, and, in particular, to FIG. 1 thereof, cover 10 is formed of an appropriate sheet-like material such as canvas, high-strength nylon, or the like, and includes central panel 12 dimensioned to overlie the bed area of the truck with which the cover is to be utilized. Extending about the periphery of central panel 12 are side flap panels 14 and 16, front flap panel 18, and rear flap panel 20. Each of the side panels 14, 16 is of a height h corresponding to the expected maximum height of carried loads above the top edge of the truck bed walls. The height of rear panel 20 is somewhat greater than the height h, as it includes an additional distance h' sufficient to provide an overlap over the rear gate portion of the bed, as will be explained herein. Similarly, front panel 18 is of an additional height h", utilized to allow affixation to the front of the bed, and also provides for storage of the cover as will be explained.

Each of the side panels 14, 16 is provided with a pair of adjacent rows 22, 24 of fastening means 26 arranged in a laterally-directed manner. The fastening means 26 preferably comprises a series of grommets 54, adopted to mate with stud fasteners located on the bed side walls as seen in FIG. 2. The two rows of fasteners are located at the approximate mid-point of the height of the panels, on either side of fold-line 28. Mounted adjacent the outer edges 30, 32 of the side panels 14, 16 are lines of fasteners 34, which extend along the length of the side panels in registry with the fasteners 26. Strip-like fastener elements 36, are located along the outer edges 30, 32 of the side panels, with mating fastener element 36' of increased width to accommodate both fasteners 36 located along the center of central panel 12. Such fasteners may be the complementary hook-and-eye fabric-like connectors sold under the trademark VELCRO. The fasteners 36, 36' allow the side panels 14, 16 to be folded over the central panel 12 and secured when not in use.

Similar complementary strip-like fastener elements 38, 38' are located on the bottom surfaces of the panels 14, 16. In particular, elements 38 are located proximate the outer edges of the panels, directly below the elements 36, while elements 38' are located along the inner edge of the panels 14, 16, adjacent central panel 12. These fastener elements permit the side panels to be folded to half height by aligning sub-panels 14a, 14b and 16a, 16b along the fold lines and may be best seen, in such a position, in FIG. 9.

Rear panel 20 is divided by fold-lines 40, 42 into three sub-panels 20a-c, each of which is bounded along its inner and outer edges, lines of fasteners 44, 46, respectively. Sub-panels 20a and 20b are equal in height to sub-panels 14a, b, while panel 20c may be of any convenient height to allow sufficient overlay over the rear bed wall when the cover is in the fully raised position. Conveniently, it may be of the same height as sub-panels 20a,b. The lines of fasteners again are formed of individual grommet elements 54 aligned in registry along the length of the panel, and which are adapted to be mountable upon stud fasteners located on the bed rear wall.

Similarly, front panel 18 is divided by fold-lines 48, 50 into three sub-panels, each of which may be equal to the height of the respective sub-panel of side panels 14 and 16 and rear panel 20. An integral pouch panel 52 is formed at the distal end of panel 18c, and allows the cover to be rolled up and stored in a compact and convenient fashion. As on the other panels, lines of fasteners 44, 46 are located along the sub-panel fold lines and margins.

As best seen in FIG. 2, the individual fastener means 26, 34, 44, and 46 may advantageously be formed of oval grommets 54 mounted to the cover material so as to create an elongated opening 56 through which the pivoting head 58 of compatible stud fastener 60 may be inserted and pivoted. The stud fasteners are mounted as appropriate to the truck body by threaded portion 62.

While the grommets 54 are dimensioned to mate with the stud fasteners 60, they further may be used as attachment points for optional rubber straps or other means to secure the cover to the bed. Primary fastening, however, is accomplished by the stud fasteners.

As depicted in FIGS. 3 through 6, cover 10 may be utilized in a first orientation to cover a load which does not extend above the truck bed walls. As shown in FIG. 3, pickup truck 66 has bed side walls 68 and a bed rear wall or gate 70 upon which the cover 10 is installed. In this orientation, the individual sub-panels 20a, b, c of rear panel 20 are folded, accordion-style, as seen in FIG. 4, such that the individual grommets 54 on each panel are in alignment with the respective grommets on the other panels to permit the mating stud fasteners 60 affixed to the bed rear wall 70 to extend through the aligned grommet openings, thus retaining the rear panel in the folded position against the bed rear wall. In a similar manner, front panel 18 may be folded and affixed to the front of the bed, either vertically or horizontally as dictated by the construction of the truck. A front-mounted tool box may alternatively serve as a connection location.

The cover side panels 14 and 16 are folded inwardly over the adjacent portions of central panel 12, as detailed in FIGS. 5 and 6, such that the strip connectors 36, located along the side panel outer edges, engage with the central connector strip 36' on panel 12. Underlying strip connectors 72, located on the bottom surface edges of central panel 12 adjacent side panels 14 and 16, engage with complementary strips 72' affixed along the top surface of bed side walls 68 and retain the edges of the cover 10 in position. The strips 72' may be affixed to the top of the bed walls by an appropriate adhesive, while strips affixed to the cover 10 may be sewed, glued or otherwise affixed in a known manner.

Figure 9:
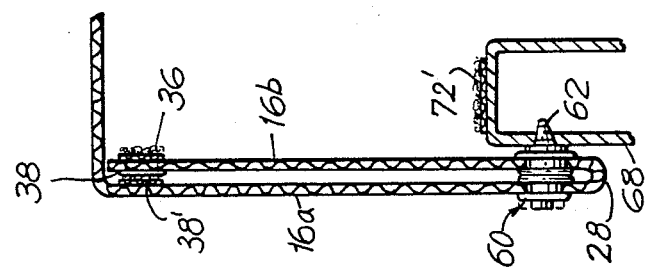
FIG. 9 is an elevational section view taken along line 9—9 of FIG. 7 depicting the stowage or folding of the side panels.
Figure 7:
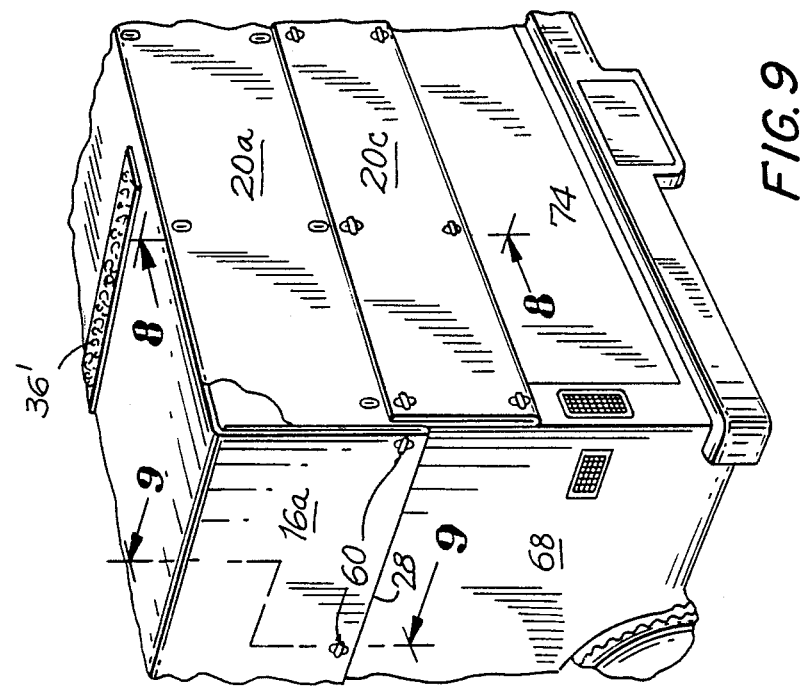
FIG. 7 is a perspective view of a typical rear corner of a truck having an intermediate elevation load having the cover in the partially extended position installed thereon.

As illustrated in FIGS. 7 through 9, the cover 10 can also be utilized in connection with a load that extends above the top surface of the truck bed walls an intermediate height and, in particular, for a load that extends up to one half the height h as depicted in FIG. 1. In this configuration, rear sub-panel 20c is folded to overlie panel 20b, as may be best seen in FIG. 8, providing a rear panel having height sufficient to cover the load (sub-panel 20a) and to be fastened to the bed rear wall. Once again, the alignment of the grommets 56 in sub-panels 20b and 20c allow panel 20 to be affixed to the bed rear wall 70 by use of the aligned stud fasteners 60. Again, front panel 18 is similarly affixed to the bed.

The sub-panels 14b and 16b are folded under their corresponding inner panels 14a, 16a and, as best seen in FIG. 9, are retained in position by the strip connectors 38 on the bottom surfaces of the sub-panels 14b, 16b mating with connectors 38' on the bottom surface of sub-panels 14a, 16a. So folded, lines 22 and 24 of grommets 54 are in alignment, and allow the free edges of the side panels defined by the fold-lines 28 to be secured adjacent a top edge of the bed side walls 68 by the stud fasteners 60 located thereon.

For loads extending even higher above the bed walls, and up to the height h, the cover 10 may be oriented and placed as illustrated in FIGS. 10 through 13. As shown therein, all panels or flaps 14-20 are fully extended. The grommet lines on rear sub-panel 20c engage the stud fasteners 60 on the bed rear wall. Similarly, the line 34 of grommets 46 located along the outer edges 30 and 32 of panels 14 and 16, respectively, mate with the stud fasteners 60 along the top edge of the bed side walls 68.

As depicted in FIGS. 13 through 15, the cover of the present invention may be conveniently stowed at the front end of the bed by use of the integral pouch 52. The side panels 14 and 16 may be folded over the central panel 12 in the manner of FIG. 5, and are maintained by strip connectors 36 and 36'. The cover is then rolled forward into a cylindrical form, and fits within the pouch 52. The pouch consists of integral panel 74 extending from edge 76 of sub-panel 18c, and formed into a main pouch body having a curved configuration about stitched, circular end pieces 80. An opening 90 is formed to provide access to the pouch interior. Top and bottom mounting flaps 82 and 84 extend across the width of the pouch, are affixed to panel 74 by stitching or the like, and are provided with grommets 86 at their free ends to allow affixation of the pouch to the bed through stud fasteners 88. When the cover is rolled up into the pouch 52, a loop portion 92 may be formed to provide a convenient grip when the cover is sought to be removed from the pouch and unrolled.

It is evident from the foregoing that the present invention provides for a novel and efficient way to cover and protect various-sized truck loads, and that substitutes and modifications to the embodiment described herein are possible without departing from the true scope and spirit of the invention.

I claim:

1. A cover for the protection of a pickup truck bed and the like, comprising a central rectangular portion adapted to overlie the truck bed bounded along each of its edges by an outwardly extending flap portion; each of said flaps having at least one fold line extending across said flap parallel to the adjacent edge of said central portion to define a plurality of adjacent sub-panels on said flap; first mounting means located proximate the edges of said central rectangular portion for removably affixing said central rectangular portion to the sides of the truck bed; and second mounting means located on each of said sub-panels of said flaps for connecting said sub-panels to the sides of said bed, said second mounting means comprising a series of grommets mounted on each of said sub-panels mateable with a series of mounting posts located on the bed walls; at least some of said flaps further including means for retaining said sub-panels in a folded position, said retaining means comprising pairs of complimentary hook-and-eye fabric sections.

2. The apparatus of claim 1, wherein said first mounting means comprise complementary hook-and-eye fabric sections mounted to the edges of said central rectangular flap and to the sides of the truck bed.

3. The apparatus of claim 2, further comprising a storage pouch extending from one of said extending flap portions.

4. The apparatus of claim 3, wherein said storage pouch includes a main pouch body portion formed integrally with said cover.

5. The apparatus of claim 4, wherein said storage pouch further includes a pair of mounting flaps affixed to said main pouch body and having means for affixing said flaps to the truck bed.

* * * * *